(12) United States Patent
Ustuner et al.

(10) Patent No.: US 6,358,205 B1
(45) Date of Patent: Mar. 19, 2002

(54) MEDICAL DIAGNOSTIC ULTRASONIC IMAGING SYSTEM WITH ADAPTIVE FRONT-END GAIN AND ADAPTIVE TRANSMITTER GAIN

(75) Inventors: Kutay Ustuner, Mountain View; Ching-Hua Chou, Fremont, both of CA (US)

(73) Assignee: Acuson Corporation, Mountain View, CA (US)

( * ) Notice: Subject to any disclaimer, the term of this patent is extended or adjusted under 35 U.S.C. 154(b) by 0 days.

(21) Appl. No.: 09/368,987

(22) Filed: Aug. 5, 1999

(51) Int. Cl.[7] ................................ A61B 8/00
(52) U.S. Cl. .............................. 600/437; 73/631
(58) Field of Search .......................... 600/437, 442; 73/549, 631

(56) References Cited

U.S. PATENT DOCUMENTS

| | | | | |
|---|---|---|---|---|
| 4,658,827 A | * | 4/1987 | He et al. ................ 73/549 |
| 4,662,380 A | * | 5/1987 | Riley ..................... 73/631 |
| 4,852,576 A | | 8/1989 | Inbar et al. |
| 5,127,409 A | * | 7/1992 | Daigle ................... 600/443 |
| 5,257,624 A | * | 11/1993 | Fraser et al. ............ 73/631 |
| 5,307,815 A | * | 5/1994 | Gatzke et al. .......... 600/437 |
| 5,313,948 A | * | 5/1994 | Murashita et al. ..... 600/458 |
| 5,579,768 A | * | 12/1996 | Klesenski |
| 6,113,544 A | * | 9/2000 | Mo ......................... 600/447 |
| 6,120,446 A | * | 9/2000 | Ji et al. .................. 600/437 |

* cited by examiner

Primary Examiner—Francis J. Jaworski
(74) Attorney, Agent, or Firm—Brinks Hofer Gilson & Lione

(57) ABSTRACT

The front-end gain of a medical diagnostic ultrasonic imaging system receiver is adaptively set by acquiring receive samples that vary in range, generating a gain function that varies in range as a function of envelope amplitude of the receive samples, and then controlling the front-end gain with the gain function. In this way, front-end gain is set in accordance with the currently prevailing imaging conditions, and front-end gain that is excessively high or low is avoided. Transmitter gain is adaptively set to limit or prevent front-end gain saturation of the receiver.

33 Claims, 4 Drawing Sheets

MEDICAL DIAGNOSTIC ULTRASONIC IMAGING SYSTEM WITH ADAPTIVE FRONT-END GAIN AND ADAPTIVE TRANSMITTER GAIN

BACKGROUND

The present invention is directed to improvements to medical diagnostic ultrasonic imaging systems that avoid the drawbacks associated with predetermined, stored front-end gains.

Medical diagnostic ultrasound imaging systems typically use preset front-end gains. In many applications multiple front-end gains are stored, and an appropriate front-end gain is selected for a particular application based upon the specific transducer and the transmit and receive frequencies in use for a given examination. Such stored front-end gains are often generated based on assumptions about the attenuation coefficient of the propagation medium. However, the attenuation coefficient can vary widely, depending upon the type of tissue being imaged. This is particularly true when a part of the propagation path passes through a non-attenuative structure, such as the bladder, the gall bladder, a cyst, amniotic fluid, or the like, or through blood pools (such as those encountered in chambers of the heart, the aorta, and other large vessels). In these cases, a preset front-end gain can be suboptimal.

Some prior-art ultrasonic imaging systems apply a portion of the user-controlled system gain, e.g. master gain and time gain compensation, to the front-end amplifier as an offset to a predetermined front-end gain curve. However, these systems often suffer from sub-optimal front-end gain, not only because the user gain controls are typically only range varying, but also because it is not easy to detect over-gain or under-gain conditions, except perhaps in extreme cases, and then only in B-mode imaging. Display dynamic range and post processing map selections, monitor brightness/contrast settings, and ambient light may prevent detection of over-gain and under-gain conditions. Even when extreme over-gain and under-gain conditions are present, user-controlled gain is often left misadjusted due to user inexperience, lack of sufficient time for continuous gain adjustments, subjective brightness preferences, and the like.

If the front-end gain is set too high for a particular application, the front-end amplifiers of the imaging system saturate. This can cause loss of resolution and, in the event of a high degree of saturation, loss of much or all of the imaging information.

On the other hand, if the front-end gain is set too low for a particular application, then the signal-to-noise ratio of the acquired receive signal is compromised. This loss in signal-to-noise ratio is due to the fact that there are typically noise sources such as AND quantization noise in the receive signal path after the front-end gain stage.

SUMMARY

By way of introduction, one preferred embodiment described below adaptively sets the front-end gain of a medical diagnostic ultrasound imaging system by acquiring a plurality of receive samples that vary in range (or in range and azimuth), generating a gain function that varies in range (or in range and azimuth) as a function of envelope amplitude of the acquired receive samples, and then controls the front-end gain of the imaging system with the generated gain function. In this way, the front-end gain is consistently set to a high level that avoids saturation.

The foregoing discussion has been provided merely by way of introduction, and is not intended as a limitation on the following claims.

BRIEF DESCRIPTION OF THE DRAWINGS

FIG. 5 is a graph showing an adaptive gain function generated with the method of FIG. 3.

FIG. 6 is a block diagram of a portion of a signal path of a second preferred embodiment.

DETAILED DESCRIPTION OF THE PRESENTLY PREFERRED EMBODIMENTS

Figure 1:
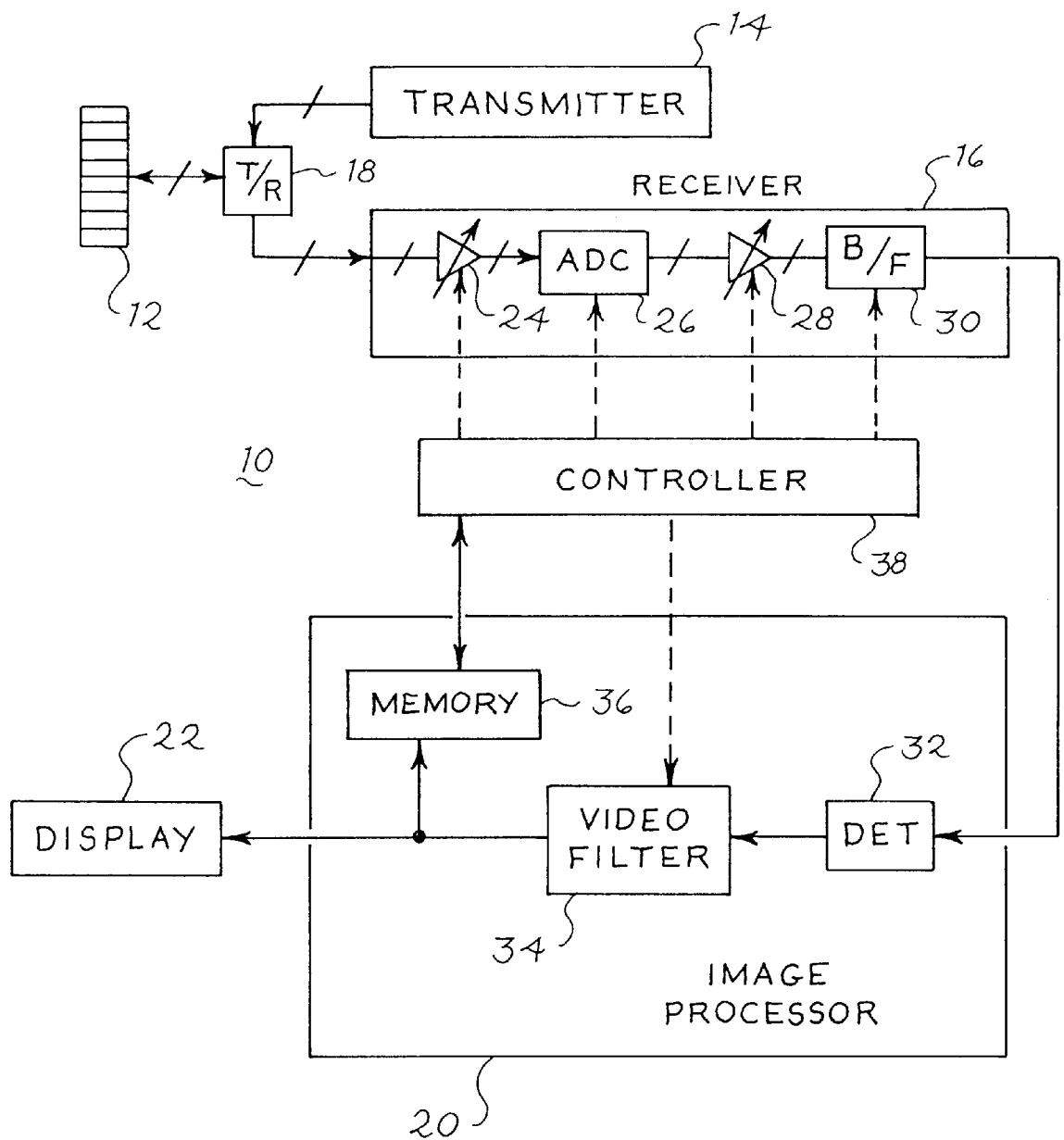
FIG. 1 is a block diagram of a medical diagnostic ultrasound imaging system that incorporates a preferred embodiment of this invention.

One preferred embodiment of this invention will be described in conjunction with the medical diagnostic ultrasonic imaging system 10 of FIG. 1. The system 10 includes a transducer 12 that is connected to a transmitter 14 and a receiver 16 by a transmit/receive switch 18.

A wide variety of conventional devices can be used for the elements 12 through 18. For example, the transmitter 14 and the receiver 16 can use digital or analog signal processing methods. The transducer 12 can be an array or a single-element transducer. When an array transducer is used, the arrangement of the transducer can be selected as appropriate for the particular application. In particular, the array type (1, 1.5, 2 dimensional arrays), the transducer geometry (plane or curved), the scan geometry (linear, Vector (TM), sector, steered linear, etc.) and the scan method (mechanical, electronic) can all be selected as desired. As well known to those skilled in the art, the transmitter 14 applies transmit waveforms to the transducer 12 which generates an ultrasonic beam steered along a selected scan line. The receiver 16 forms beamformed receive signals from the transducer signals generated in response to echoes from the target.

In this example, the receiver 16 uses digital signal processing techniques, and the transducer 12 is an array. The receiver 16 includes a plurality of front-end amplifiers 24, one for each of the transducer elements of the transducer array 12. In this embodiment, the front-end amplifiers 24 provide a variable front-end gain, as selected by a controller 38.

Each of the front-end amplifiers 24 is connected to a respective A/D converter 26, which digitizes the respective transducer signal and applies the digitized transducer signal to a respective compensating amplifier 28. The compensating amplifier 28 provides a variable gain (in this case in the digital domain) as specified by the controller 38. The digitized transducer signals from the compensating amplifiers 28 are then applied to a beamformer 30 to generate beamformed receive signals. Alternately, the compensating amplifier 28 may be positioned after the beamformer 30.

The beamformed receive signals from the beamformer 30 are applied to an image processor 20, which generates display signals for display on a display 22. In this example, the beamformed receive signals are applied to a detector 32, and the beamformed, detected, log-compressed receive signals are applied to a video filter 34. A memory 36 allows beamformed receive signals from any desired scan line to be recorded, under control of the controller 38.

The system 10, including the controller 38, is preferably configured to provide an adaptive front-end gain as described below. In general terms, the signal strength of the returned echoes is measured (preferably though but not necessarily before beam formation) as a function of one or more of the following parameters: depth, scan line angle, beam, and transducer channel. The measurement of return echo strength is repeated, for example once every M image frames or once every T seconds, where M and T can be user-selectable parameters. As another approach, the measurement of return echo strength can be made only upon user request, such as when the user presses a selected key. Once the return echo strength has been measured, an appropriate, adaptively determined front-end gain is determined and used to control the front-end amplifiers 24 and the compensating amplifiers 28.

The techniques described below are well-suited for use both with conventional ultrasonic imaging systems, in which the first stage of transducer signal amplification is remote from the transducer, as well as with alternative imaging systems that use active transducers, where the first stage of transducer signal amplification is positioned at the transducer. In this latter case the stage of amplification at the transducer can be considered as included in the receiver.

Figure 2:
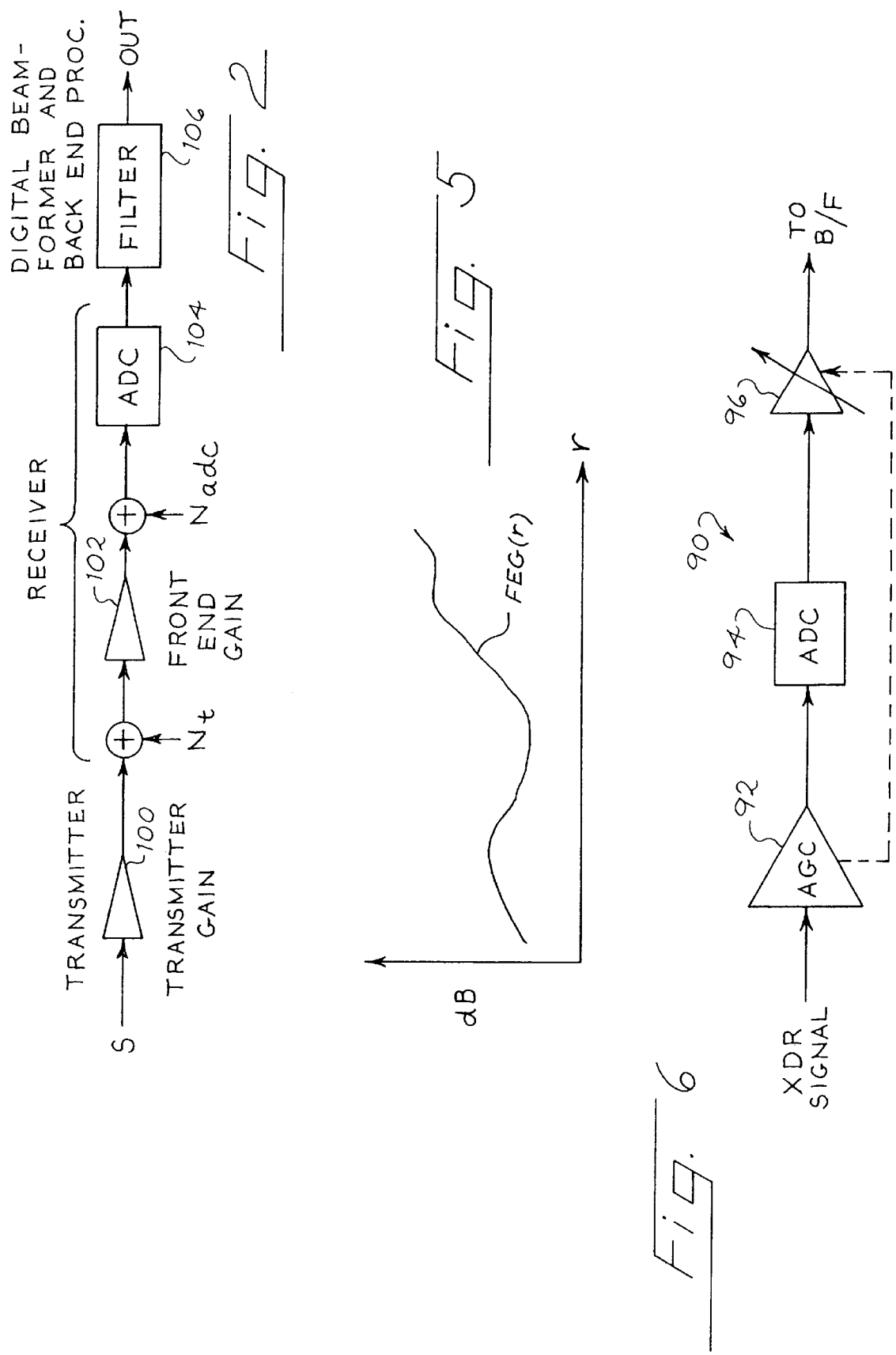
FIG. 2 is a block diagram of a simplified model of an ultrasonic imaging system.

FIG. 2 provides a schematic diagram of a simplified model of an ultrasonic imaging system that shows the gain stages that affect the front-end saturation and signal-to-noise ratio of a typical digital beamformer. In FIG. 2, the order of the transmit amplifier 100 and the source S (the object) are interchanged for simplification. In FIG. 2, S represents the echo from the object for transmit gain of 1. Saturation at the receiver front-end stage or stages up through and including the front-end gain amplifier 102 is controlled by the transmit amplifier 100 alone. Saturation of the A/D converter 104, on the other hand, is controlled by both the transmitter amplifier 100 and the front-end gain amplifier 102. The filter block 106 represents the single channel of the beamformer and other back-end processing. $N_t$ represents additive thermal noise, and $N_{adc}$ represents additive quantization noise. Adaptive optimization of the transmitter gain and the front-end gain of the receiver preferably is performed by monitoring the RF signal envelope at the input of the front-end gain amplifier 102. However, if there is no direct or ready access to that signal, suitable monitoring alternatively can be performed at any of the succeeding stages, such as at the output of the envelope detector.

Figure 3:
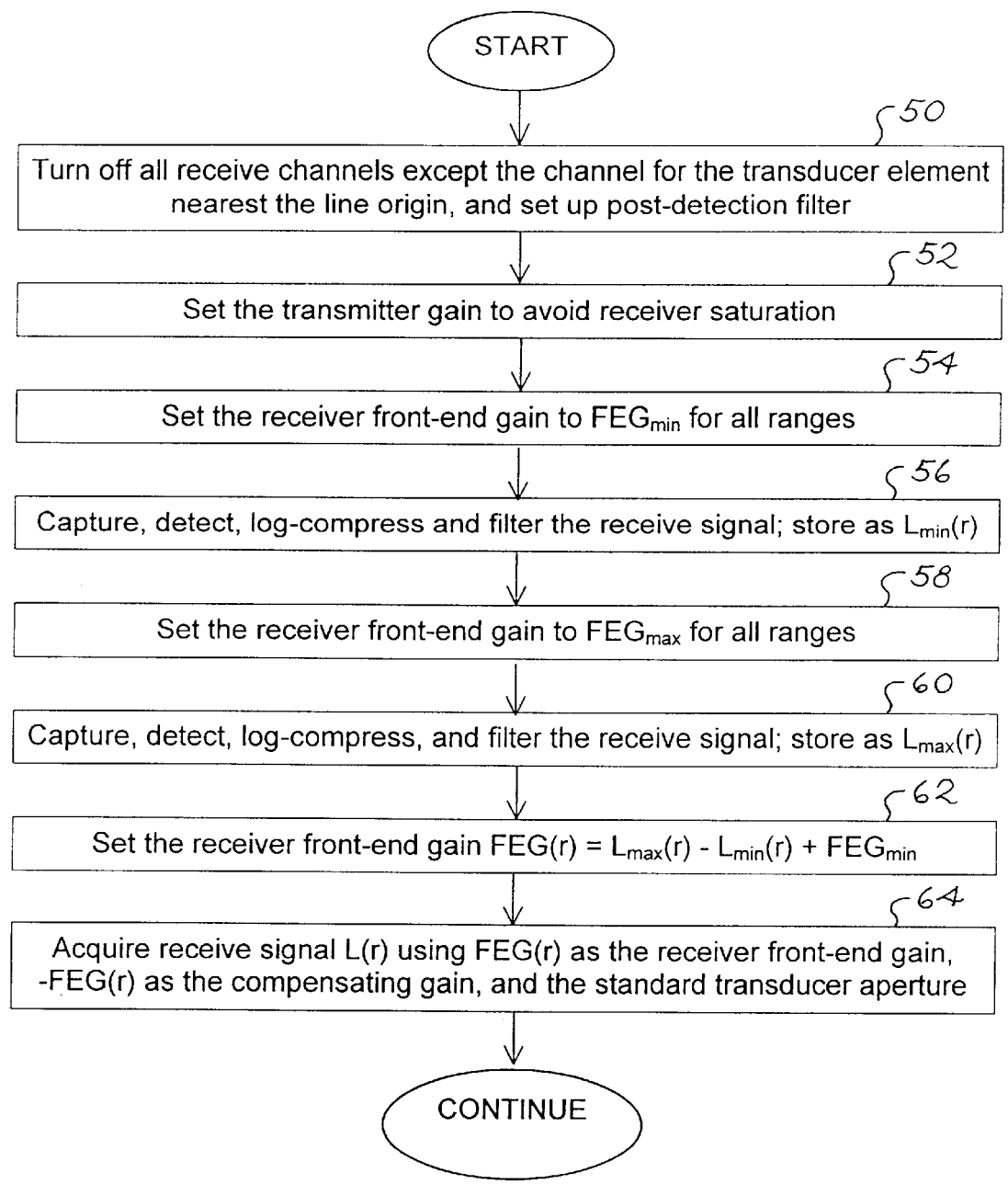
FIG. 3 is a flow chart of a method performed by the system of FIG. 1.

FIG. 3 presents a flow chart of an adaptive front-end gain method implemented by the system 10 of FIG. 1. In the flow chart of FIG. 3 all gain values and stored signals are represented in units of dB.

As shown at 50 in FIG. 3, the first step is to turn off all the transducer channels except for the channel for the transducer element that is nearest the line origin, and to set up the post-detection filter. Preferably, the post-detection filter is set to a narrow-bandwidth, low-pass configuration such that the filter kernel covers ten or more independent receive samples of varying ranges. This configuration for the filter 34 (FIG. 1) helps to suppress speckle effects.

At 52, the transmitter gain TG of the transmitter 14 is set to avoid receiver saturation. A preferred method for setting transmitter gain is described below in conjunction with the flow chart of FIG. 4.

At 54, the receiver front-end gain is set to $FEG_{min}$ for all ranges, and then at 56, a receive signal is captured, detected, log-compressed, filtered and stored as $L_{min}(r)$.

At 58, the receiver front-end gain is set to $FEG_{max}$ for all ranges, and then at 60, another receive signal is captured, detected, log-compressed, filtered and stored as $L_{max}(r)$.

At 62, the receiver front-end gain FEG(r) is then set equal to $L_{max}(r)-L_{min}(r)+FEG_{min}$. In this way, the receiver front-end gain is adaptively set such that the front-end gain varies as a function of range in order to maintain the transducer signal applied to the respective A/D converter at a high, unsaturated or little-saturated value.

Once the front-end gain has been adaptively set, then a receive signal L(r) is acquired at 64, using FEG(r) as the receiver front-end gain, −FEG(r) as the compensating gain, and the standard transducer aperture appropriate for the particular application.

FIG. 5 shows a schematic example of the front-end gain FEG(r) in one simplified example. In FIG. 5, the range axis is plotted horizontally and the front-end gain in decibels is plotted vertically. Note that the front-end gain FEG(r) does not vary in a monotonic manner with range. This is quite different from the prior art approach, in which the front-end gain typically increases monotonically from a low value at the shortest range to a substantially higher value at the longest range. In one application, the front-end gain function varies in range as an inverse function of the envelope amplitude of the receive samples.

Figure 4:
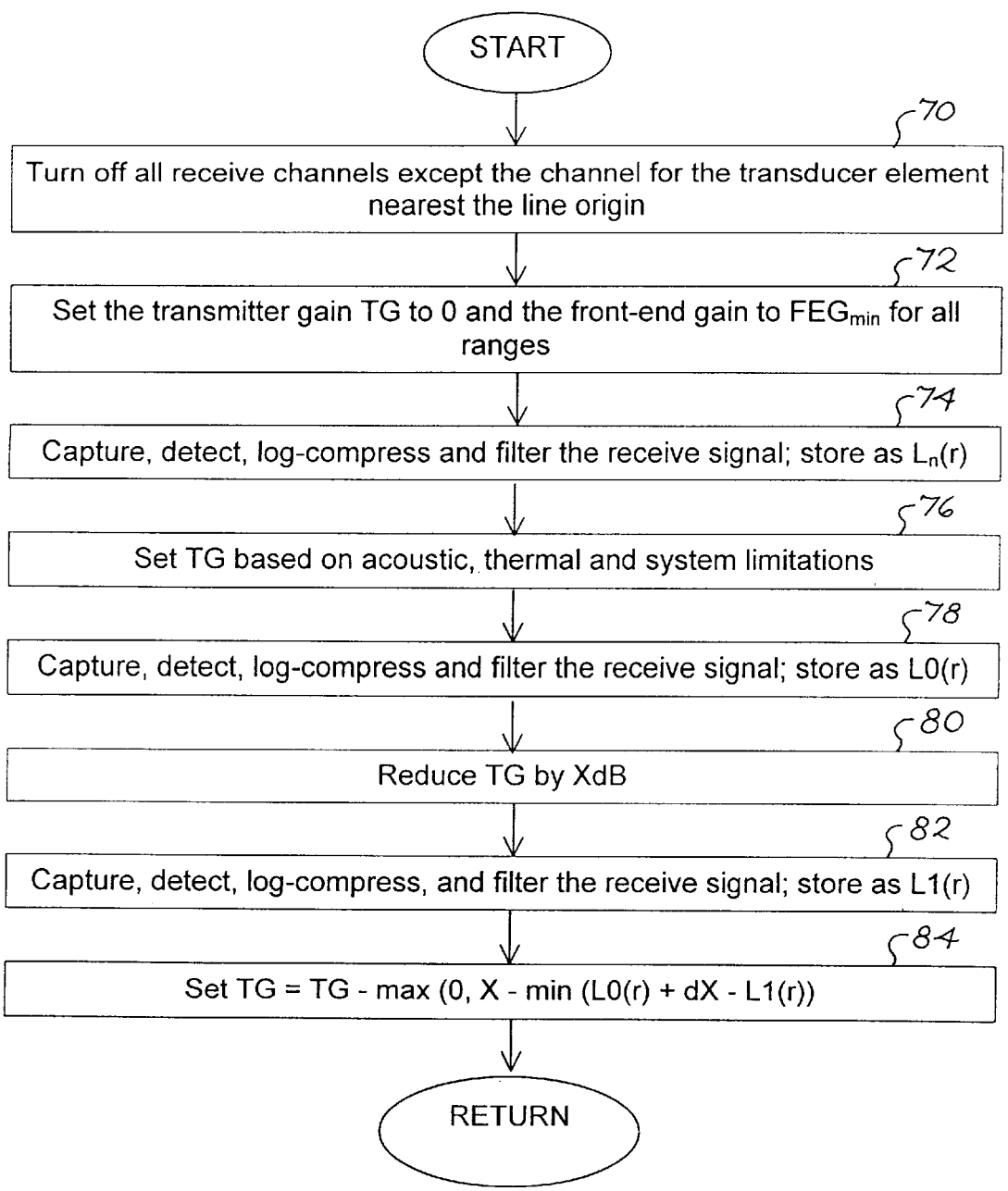
FIG. 4 is a flow chart of a transmitter gain setting method included in the method of FIG. 3.

Turning now to FIG. 4, blocks 70 through 84 illustrate one preferred method for reducing or totally eliminating saturation of the receive signal path preceding the front-end gain amplifier. The method of FIG. 4 applies a negative offset to the transmitter gain that satisfies the acoustic, thermal, and system limitations. In the flow chart of FIG. 4, all gain values and stored signals are represented in units of dB.

At 70, all of the receive channels are turned off except the channel for the transducer element nearest the line origin. At 72, the transmitter gain TG is set to 0 and the front-end gain is set to $FEG_{min}$ for all ranges. $FEG_{min}$ that is used at 72 should either be a zero gain or a low gain value such that the signal path after the front-end gain amplifier is well below saturation.

At 74, a receive signal is captured, detected, log-compressed, filtered and stored as $L_n(r)$. $L_n(r)$ provides a measure of system noise as a function of range. Once $L_n(r)$ is captured, it can be used until a system parameter that affects the noise floor level (e.g., operating frequency) is changed, in which case it is preferred to recapture $L_n(r)$.

At 76, the transmitter gain TG is set at a standard value based on conventional acoustic, thermal, and system limitations. At 78, a receive signal is captured, detected, log-compressed, filtered and stored as L0(r). Then the transmitter gain TG is reduced by XdB at 80 and another receive signal is captured, detected, log-compressed, filtered and stored as L1(r) at 82. The value of X used at 80 should be selected such that (a) there is at least one range sample for which $L0(r)>L_n(r)+X$, and (b) the minimum value of (L0(r)−L1(r))>0, where the minimum is taken for all values of (r) for which L0(r) is greater than $L_n(r)+X$.

At 84, the transmitter gain TG is reduced if necessary to avoid saturation of the front-end amplifier of the receiver. This is done by reducing the transmitter gain TG by the greater of 0 or the parameter X−min (L0(r)+dX−L1(r)). This minimum value is taken over all values of r that satisfy the condition $L0(r)>L_n(r)+X$.

At 84, the transmitter gain TG is reduced if there is any saturation exceeding dX decibels. dX represents the saturation tolerance factor, and it determines the compromise between saturation and signal-to-noise ratio. For example, when dX is set equal to zero, no saturation is tolerated. The value used for dX may vary depending upon the mode of operation, e.g., B-mode, F-mode, harmonic imaging, contrast agent imaging, etc., or on the clinical application, e.g., abdomen, small parts, etc.

The method of FIG. 4 may be used in any application where it is advantageous to set the transmitter gain so as to avoid receiver saturation, and the method of FIG. 4 is therefore not limited to use in combination with the method of FIG. 3.

Note that the compensating gain provided by the amplifiers 28 varies inversely as the front-end gain supplied by the amplifiers 24. Thus, the adaptive setting of the front-end gain does not have an overall effect on image brightness as presented on the display 22.

Of course, many variations are possible. For example, receive sample measurements can be made using multiple transducer channels rather than the single channel as described above. When multiple transducer channels are used, they are preferably selected to be closely adjacent to the ultrasound line origin.

The receive samples that are used to generate the gain function can be acquired by firing extra scan lines that are used solely for the measurements described above. Alternately, the envelope amplitude of one or more transducer channels can be monitored during a normal imaging scan in order to measure receive signal sample envelope amplitude and to generate a gain function as described above without firing extra beams.

As another approach, the receiver 16 and optionally the transmitter 14 can operate to provide multiple simultaneous beams. If multiple receive beams are acquired by the receiver 16, one of these receive beams can be used for signal strength measurements, while one or more of the remaining receive beams can be used for conventional imaging.

The preferred embodiment described above can readily be implemented with minimum of complexity, because their adaptive front-end gain function does not vary from transducer channel to transducer channel. A more optimal but significantly more complex embodiment optimizes the front-end gain for each transducer channel independently such that each transducer channel applies the highest front-end gain that maintains that respective transducer channel below a saturation threshold. With this alternative embodiment, the channel-to-channel front-end gain variations are compensated in the signal path after the last noise source but preferably before the beamformer. For example, the compensating amplifiers can be placed immediately following the A/D converters, as shown in FIG. 1.

FIG. 6 shows a portion of a receive signal path 90 of a second preferred embodiment. This receive signal path 90 is well-suited to optimize the front-end gain for each transducer channel independently. In this embodiment, the signal path 90 includes a front-end amplifier 92 that includes automatic gain control. That is, the envelope of the output of the amplifier 92 is kept substantially constant over time by means of a feedback loop. The amplifier 92 receives a transducer signal from the transducer probe (not shown in FIG. 6) and applies the amplified transducer signal to an A/D converter 94. The output of the A/D converter is applied to a compensating amplifier 96, and the output of the compensating amplifier 96 is supplied to a beamformer. The gain of the compensating amplifier 96 is controlled by the automatic gain control of the amplifier 94 via the control path 98. The compensating amplifier 96 thus compensates for the time varying gain applied by the amplifier 92. The compensating amplifier 96 is preferably positioned after the last noise source in the receive signal path 90 prior to the beamformer.

Preferably, the gain of the amplifier 92 is a slowly varying function of time, i.e. the gain curve of the amplifier 92 tracks only changes in the average attenuation coefficient of the tissue and not the instantaneous speckle envelope. As another alternative the gain curve of the amplifier 92 can be made to track the sudden changes of the envelope levels only in the positive or negative direction while responding more slowly to changes in the negative or positive direction.

The embodiment in FIG. 6 applies an independent gain function for each channel of the receiver. Alternately, automatic gain control techniques can be used to apply the same gain curve as obtained from a single transducer channel or a group of transducer channels to all of the transducer channels or to any desired set of the transducer channels.

In general, the compensation amplifiers 28, 96 can be placed at many points along the receive signal path. Preferably, the compensation amplifiers 28 are placed after the last substantial noise source. In the case where the front-end gain is adaptively optimized for each acquisition channel independently, the compensation amplifiers are preferably placed before the beamformer. In the case where the front-end gain is adaptively optimized for all acquisition channels, with a common front-end gain factor, a single compensation amplifier is preferably applied in the back-end gain stage, between the detector and the video filter.

Alternative approaches also exist that allow the transmitter gain to be adjusted to avoid saturation. For example, the A/D converter can be provided with an extra bit indicating saturation, and transducer gain can be lowered until this bit indicates that saturation has been avoided. As another alternative, transducer gain can be lowered in successive steps, and transducer or receive signals can be monitored to determine whether the decrease in envelope amplitude is in proportion to the transmitter gain. This process is repeated until receiver saturation is reduced to an acceptable level or eliminated. Any desired user interface may be provided to allow user control of adaptive front-end gain. For example, the user may be allowed to turn adaptive front-end gain optimization on or off as desired.

As another approach, the front-end gain function calculated from a first scan line N can be used for the next scan line N+1 in order to reduce the requirement for additional scan lines.

Of course, the method of FIG. 3 can be repeated for different scan lines that differ in scan direction and/or transmit focus. All of the adaptive front-end gain methods described above can be used for any desired ultrasonic imaging mode, including for example B mode, color Doppler, spectral Doppler, and other imaging modes.

As indicated above, the present invention can be adapted for use with a wide variety of ultrasonic diagnostic imaging systems. One ultrasonic imaging system that is presently preferred for use with this invention uses a receive beamformer as described in U.S. Pat. No. 5,685,308, a transmit beamformer as described in U.S. Pat. No. 5,675,554, and a controller as described in U.S. Pat. No. 5,581,517, all assigned to the assignee of the present invention.

As used herein, the term "receive samples" is intended broadly to encompass signal envelope amplitude at varying times along one or more scan lines. Thus, receive samples can take analog as well as digital forms.

The term "receive signals" is intended broadly to encompass analog or digital signals at any point in the receive signal path of an ultrasonic receiver downstream of the transducer, before or after beam formation, and before or after detection. Thus transducer signals, beamformed signals, and filtered, detected signals are all examples of receive signals.

The term "receive signal path" is intended to cover all signal processing of transducer signals downstream of the transducers, including any amplifiers in the transducer probe.

The term "coupled" is intended broadly to encompass elements that are coupled both directly and indirectly. Thus, a first element is said to be coupled with a second element, whether or not additional elements are interposed therebetween.

The term "inverse" is intended broadly to include differences when signals are expressed in decibels. Thus, an inverse function can include both the inverse of a linear envelope amplitude signal and the negative of a logarithmic envelope amplitude signal.

The term "use" is intended broadly to encompass the use of a function or signal with or without modification.

The term "varies" is intended broadly. Thus, a sample or gain function that varies in range may vary only in range, or alternatively may vary in range as well as in one or more additional parameters, such as azimuth.

It should be apparent from the foregoing description that a general method has been described for applying an adaptive front-end gain to a receiver of a medical diagnostic ultrasound imaging system. In this method, receive signals are acquired and an adaptive gain function is generated as a function of the envelope amplitudes of the acquired receive signals. The front-end gain of the receiver is then controlled using the generated gain function.

The foregoing detailed description has described only a few of the many forms that this invention can take. For example, this invention can be adapted for use with any suitable ultrasonic imaging system and is not limited to the specific examples set out above. Also, the widest range of programming languages and programming techniques can be used to implement the invention. For this reason, the foregoing detailed description is intended only by way of example. It is only the following claims, including all equivalents, that are intended to define the scope of this invention.

What is claimed is:

1. A method for adaptively setting a front-end gain in a medical ultrasound imaging system receiver comprising at least one analog to digital converter, said method comprising:
   (a) acquiring a plurality of receive samples that vary in range;
   (b) generating a gain function that varies as a function of envelope amplitude of the receive samples, said function operative to maintain the receive samples applied to the analog to digital converter at high values that are substantially unsaturated;
   (c) adaptively controlling the front-end gain with the gain function of act (b) upstream of the at least one analog to digital converter, thereby maintaining the receive samples applied to the at least one analog to digital converter at high, substantially unsaturated values.

2. The method of claim 1 wherein the plurality of a receive samples of act (a) are associated with a single transducer element of a receive active aperture.

3. The method of claim 2 wherein the single transducer element is situated adjacent to an ultrasound line origin.

4. The method of claim 1 wherein the plurality of receive samples in act (a) are associated with a plurality of transducer elements of a receive active aperture.

5. The method of claim 4 wherein the receive elements are situated adjacent to an ultrasound line origin.

6. The method of claim 1 wherein the gain function varies in range as an inverse function of envelope amplitude of the receive samples.

7. The method of claim 1 further comprising:
   (d) adjusting transmitter gain before act (a) to prevent front-end saturation of the receive samples.

8. The method of claim 1 further comprising:
   initiating acts (b) and (c) in response to a user request.

9. The method of claim 1 further comprising:
   repeating acts (a) to (c) for a plurality of scan lines that differ in at least one of scan direction and transmit focus.

10. A system for adaptively setting a front-end gain in a medical imaging system receiver comprising at least one analog to digital converter, said system comprising:
    means for acquiring a plurality of receive samples that vary in range;
    means for generating a gain function that varies as a function of envelope amplitude of the receive samples, said function operative to maintain the receive samples applied to the analog to digital converter at high values that are substantially unsaturated;
    means for adaptively controlling the front-end gain with the gain function upstream of the at least one analog to digital converter, thereby maintaining the receive samples applied to the at least one analog to digital converter at high, substantially unsaturated values.

11. The invention of claim 10 further comprising:
    means for adjusting transmitter gain to prevent front-end saturation of the receive samples.

12. The invention of claim 10 wherein the controlling means comprises means for applying the gain function and an inverse of the gain function at respective amplification stages of the receiver.

13. The invention of claim 10 wherein the gain function varies in range as an inverse function of envelope amplitude of the receive samples.

14. The invention of claim 10 wherein the receive samples vary in range and azimuth, and wherein the gain function varies in range and azimuth.

15. A method for adaptively setting a front-end gain in a medical ultrasound imaging system receiver comprising at least one analog to digital converter, said method comprising:
    (a) adaptively varying a front-end gain at a first part of signal path of a medical ultrasound imaging system receiver, upstream of said at least one analog to digital converter; and
    (b) adaptively varying a compensating gain at a second part of the signal path, downstream of said at least one analog to digital converter, said compensating gain compensating for said front-end gain.

16. The method of claim 15 wherein act (a) comprises the act of applying a receive signal to an automatic gain control amplifier.

17. A system for adaptively setting a front-end gain in a medical imaging system receiver comprising at least one analog to digital converter, said system comprising:
    (a) first means for adaptively varying front-end gain at a first part of signal path of a medical ultrasound imaging system receiver, upstream of said at least one analog to digital converter; and
    (b) second means for adaptively varying a compensating gain at a second part of the signal path, downstream of said at least one analog to digital converter, said compensating gain compensating for said front end gain.

18. The system of claim 17 wherein the first means comprises an automatic gain control amplifier.

19. A system for adaptively setting a front-end gain in a medical imaging system receiver, said system comprising:

a medical ultrasound imaging system receiver comprising a signal path comprising at least one analog to digital converter;

an automatic gain control amplifier included in the signal path and operative to adaptively set a front-end gain of the receiver, upstream of said at least one analog to digital converter; and a compensating amplifier included in the signal path downstream of the at least one analog to digital converter, said compensating amplifier coupled with the automatic gain control amplifier and operative to apply a variable gain that compensates for the adaptively set front-end gain.

20. A method for adaptively setting a transmitter gain offset in a medical ultrasound imaging system transmitter, said method comprising:

(a) acquiring a plurality of receive samples that vary in range;

(b) generating a transmit gain offset as a function of envelope amplitude of the receive samples;

(c) controlling a transmitter gain of the transmitter with the gain offset of act (b).

21. The method of claim 20 wherein the plurality of receive samples of act (a) are associated with a single transducer element of a receive active aperture.

22. The method of claim 21 wherein the single transducer element is situated adjacent to an ultrasound line origin.

23. The method of claim 20 wherein the plurality of receive samples of act (a) are associated with a plurality of transducer elements of a receive active aperture.

24. The method of claim 23 wherein the receive elements are situated adjacent to an ultrasound line origin.

25. The method of claim 20 wherein the transmitter gain offset is operative to eliminate saturation of a receive signal path associated with the transmitter.

26. The method of claim 20 wherein the transmitter gain offset is operative to limit maximum saturation of a receive signal path associated with the transmitter to a predetermined level.

27. The method of claim 15 wherein the front end gain is adaptively varied in (a) to maintain receive samples applied to the at least one analog to digital converter at high, substantially unsaturated values.

28. The invention of claim 17 wherein the first means comprises means for maintaining receive samples applied to the at least one analog to digital converter at high, substantially unsaturated values.

29. The invention of claim 19 wherein the automatic gain amplifier is operative to maintain receive samples applied to the at least one analog to digital converter at high, substantially unsaturated values.

30. The method of claim 1 wherein the receiver further comprises a beamformer downstream of the analog to digital converter.

31. The invention of claim 10 wherein the receiver further comprises a beamformer downstream of the analog to digital converter.

32. The method of claim 1 wherein the gain function of (b) varies in range.

33. The invention of claim 10 wherein the gain function generated by the generating means varies in range.

* * * * *

UNITED STATES PATENT AND TRADEMARK OFFICE
CERTIFICATE OF CORRECTION

PATENT NO.    : 6,358,205 B1
DATED         : March 19, 2002
INVENTOR(S)   : Kutay Ustuner et al.

It is certified that error appears in the above-identified patent and that said Letters Patent is hereby corrected as shown below:

Column 1,
Line 51, delete "AND" and substitute -- A/D -- in its place.

Column 6,
Line 49, delete "B mode" and substitute -- B-mode -- in its place.

Signed and Sealed this

Third Day of December, 2002

JAMES E. ROGAN
*Director of the United States Patent and Trademark Office*